US012364894B2

(12) United States Patent
Monfils et al.

(10) Patent No.: US 12,364,894 B2
(45) **Date of Patent: *Jul. 22, 2025**

(54) FIRE-FIGHTING FOAM COMPOSITION WITH MICROFIBROUS CELLULOSE

(71) Applicant: Tyco Fire Products LP, Cranston, RI (US)

(72) Inventors: JoAnna M. Monfils, Peshtigo, WI (US); John P. Libal, Peshtigo, WI (US); Blake H. Bomann, Greenville, WI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,280

(22) Filed: Aug. 24, 2023

(65) Prior Publication Data

US 2023/0405382 A1 Dec. 21, 2023

Related U.S. Application Data

(63) Continuation of application No. 17/722,978, filed on Apr. 18, 2022, now Pat. No. 11,771,939.

(60) Provisional application No. 63/297,384, filed on Jan. 7, 2022, provisional application No. 63/288,024, filed on Dec. 10, 2021, provisional application No. 63/288,020, filed on Dec. 10, 2021, provisional application No. 63/288,026, filed on Dec. 10, 2021, provisional application No. 63/245,028, filed on Sep. 16, 2021, provisional application No. 63/215,006, filed on Jun. 25, 2021, provisional application No. 63/188,633, filed on May 14, 2021.

(51) Int. Cl.
*A62D 1/02* (2006.01)
*A62C 99/00* (2010.01)
*A62D 1/00* (2006.01)

(52) U.S. Cl.
CPC ........ *A62D 1/0071* (2013.01); *A62C 99/0036* (2013.01); *A62D 1/0042* (2013.01)

(58) Field of Classification Search
None
See application file for complete search history.

(56) References Cited

U.S. PATENT DOCUMENTS

| | | | |
|---|---|---|---|
| 3,186,943 | A | 6/1965 | Barthauer |
| 3,479,285 | A | 11/1969 | Barthauer |
| 3,956,138 | A | 5/1976 | Crockett |
| 4,060,489 | A | 11/1977 | Chiesa, Jr. |
| 4,398,605 | A | 8/1983 | Conklin et al. |
| 4,410,508 | A | 10/1983 | Brown et al. |
| 5,218,021 | A | 6/1993 | Clark et al. |
| 5,225,095 | A | 7/1993 | DiMaio et al. |
| 5,296,164 | A | 3/1994 | Thach et al. |
| 5,391,721 | A | 2/1995 | Hanen et al. |
| 5,434,192 | A | 7/1995 | Thach et al. |
| 5,496,475 | A | 3/1996 | Jho et al. |
| 5,616,273 | A | 4/1997 | Clark et al. |
| 5,706,895 | A | 1/1998 | Sydansk |
| 5,882,541 | A | 3/1999 | Achtmann |
| 5,997,758 | A | 12/1999 | Barbarin et al. |
| 6,262,128 | B1 | 7/2001 | Stern et al. |
| 6,599,872 | B1 | 7/2003 | Hubert et al. |
| 7,005,082 | B2 | 2/2006 | Clark |
| 7,011,763 | B2 | 3/2006 | Clark |
| 7,135,125 | B2 | 11/2006 | Clark |
| 7,172,709 | B2 | 2/2007 | Clark |
| 7,199,083 | B2 | 4/2007 | Zevallos |
| 7,271,133 | B2 | 9/2007 | Weaver et al. |
| 7,334,640 | B2 | 2/2008 | Hanes et al. |
| 7,381,696 | B2 | 6/2008 | Hubert et al. |
| 7,541,316 | B2 | 6/2009 | Maresh |
| 7,569,155 | B2 | 8/2009 | Schaefer |
| 7,588,645 | B2 | 9/2009 | Griese et al. |
| 7,888,297 | B2 | 2/2011 | Hanes et al. |
| 7,888,308 | B2 | 2/2011 | Swazey |
| 7,994,111 | B2 | 8/2011 | Caggioni et al. |
| 8,043,999 | B2 | 10/2011 | Sullivan et al. |
| 8,076,270 | B2 | 12/2011 | Smith et al. |
| 8,207,094 | B2 | 6/2012 | Hutchins et al. |

(Continued)

FOREIGN PATENT DOCUMENTS

| | | | |
|---|---|---|---|
| CN | 1599633 | A | 3/2005 |
| CN | 101198381 | A | 6/2008 |

(Continued)

OTHER PUBLICATIONS

Derwent Acc. No. 2020-69248T; Chai, et al.; "Composition with Foaming Properties"; Derwent; Abstract for WO2020/149733A1; dated Jul. 23, 2020; 4 pages.
International Search Report and Written Opinion on PCT Appl. Ser. No. PCT/IB2022/053615 dated Jul. 26, 2022 (13 pages).
International Search Report and Written Opinion on PCT Appl. Ser. No. PCT/IB2022/053618 dated Jul. 22, 2022 (13 pages).
International Search Report and Written Opinion on PCT Appl. Ser. No. PCT/IB2022/053619 dated Jul. 29, 2022 (14 pages).
International Search Report and Written Opinion on PCT Appl. Ser. No. PCT/IB2022/053620 dated Jul. 29, 2022 (14 pages).
International Search Report and Written Opinion on PCT Appl. Ser. No. PCT/IB2022/053621 dated Jul. 29, 2022 (15 pages).

(Continued)

*Primary Examiner* — Joseph D Anthony
(74) *Attorney, Agent, or Firm* — Foley & Lardner LLP

(57) ABSTRACT

An aqueous fire-fighting composition includes a surfactant component that includes an anionic surfactant, a zwitterionic surfactant, a nonionic surfactant, or a mixture of any two or more thereof, and a suspension agent comprising microfibrous cellulose. The suspension agent may include a water-soluble oligosaccharide and/or polysaccharide co-agent together with the microfibrous cellulose. The fire-fighting composition may also include one or more of a sugar component, organic solvent and a polysaccharide thickener, and be substantially free of fluorinated additives.

3 Claims, No Drawings

(56) References Cited

U.S. PATENT DOCUMENTS 8,298,436 B2 10/2012 Michael
8,366,955 B2 2/2013 Thomas et al.
8,413,721 B2 4/2013 Welton et al.
8,524,104 B1 9/2013 Michael
8,703,691 B2 4/2014 Caggioni et al.
8,772,359 B2 7/2014 Swazey
8,783,374 B2 7/2014 Rains et al.
9,045,716 B2 6/2015 Swazey et al.
9,259,602 B2 2/2016 Robinet et al.
9,289,636 B2 3/2016 Mathis
9,420,784 B2 8/2016 Vanlaer et al.
9,487,661 B2 11/2016 Johnson et al.
9,662,522 B2 5/2017 Liu et al.
9,669,246 B2 6/2017 Bowen et al.
9,675,828 B1 6/2017 Sery
9,687,686 B2 6/2017 Blunk et al.
9,776,029 B2 10/2017 Izumida et al.
9,956,447 B2 5/2018 Martin et al.
9,956,448 B2 5/2018 Martin
10,030,214 B2 7/2018 Swazey et al.
10,071,273 B2 9/2018 Hansen et al.
10,159,863 B2 12/2018 Mariampillai et al.
10,173,089 B2 1/2019 Xie
10,214,708 B2 2/2019 Swazey et al.
10,328,297 B2 6/2019 Bowen et al.
10,335,624 B2 7/2019 Libal
10,369,394 B2 8/2019 Bowen
10,369,395 B2 8/2019 Bowen et al.
10,443,019 B2 10/2019 Fossum et al.
10,457,900 B2 10/2019 Fossum et al.
10,494,592 B2 12/2019 Applegate et al.
10,518,120 B2 12/2019 Pai et al.
10,625,108 B2 4/2020 Mariampillai et al.
10,653,910 B2 5/2020 Da Costa et al.
10,780,305 B2 9/2020 Xie et al.
10,870,030 B2 12/2020 Libal
10,940,352 B2 3/2021 Worsman
11,065,490 B2 7/2021 Lavergne et al.
11,173,334 B2 11/2021 Xie et al.
11,497,952 B1 11/2022 Monfils et al.
11,666,791 B2 6/2023 Monfils et al.
11,673,010 B2 6/2023 Monfils et al.
11,673,011 B2 6/2023 Monfils et al.
11,771,939 B2 * 10/2023 Monfils ................ A62D 1/0042
252/3
11,938,362 B2 * 3/2024 Monfils ................ A62D 1/0042
11,938,363 B2 * 3/2024 Monfils ................ A62D 1/0042
11,951,345 B2 * 4/2024 Monfils .............. A62C 99/0036
11,964,179 B2 * 4/2024 Monfils ................ A62D 1/0071
2002/0014610 A1 2/2002 Tanaka et al.
2003/0201419 A1 10/2003 Tanaka et al.
2004/0006175 A1 1/2004 Diener et al.
2005/0113272 A1 5/2005 Yeung et al.
2007/0256836 A1 11/2007 Welton et al.
2008/0108541 A1 * 5/2008 Swazey .............. C11D 17/0004
510/535
2008/0196908 A1 8/2008 Schaefer
2011/0097294 A1 4/2011 Anthony et al.
2013/0313465 A1 11/2013 Podella et al.
2014/0138104 A1 5/2014 Robinet et al.
2016/0023032 A1 1/2016 Bowen
2016/0107015 A1 4/2016 Cheng
2017/0056698 A1 3/2017 Pai et al.
2017/0259099 A1 9/2017 Blunk et al.
2017/0306562 A1 * 10/2017 Phipps ..................... D04H 1/54
2018/0325141 A1 11/2018 Nakajima
2018/0361185 A1 12/2018 Siem
2019/0008187 A1 1/2019 Konda et al.
2019/0262647 A1 * 8/2019 Havelka-Rivard .. A62D 1/0071
2019/0314660 A1 10/2019 Chirac et al.
2020/0094093 A1 3/2020 Worsman et al.
2020/0101340 A1 4/2020 Worsman
2020/0139180 A1 5/2020 Lovas
2020/0206552 A1 7/2020 Mariampillai et al.
2020/0215372 A1 7/2020 Lavergne et al.
2020/0368570 A1 11/2020 Hodgen et al.
2021/0009787 A1 1/2021 Hulbert et al.
2021/0046347 A1 2/2021 Lavergne et al.
2021/0128431 A1 5/2021 Sartingen et al.
2021/0146182 A1 5/2021 Hugener
2021/0154512 A1 5/2021 Libal
2021/0187337 A1 6/2021 Worsman
2021/0283449 A1 9/2021 Lavergne et al.
2022/0040512 A1 * 2/2022 Saari .................... A62D 1/0064
2022/0134158 A1 * 5/2022 Havelka-Rivard .. A62D 1/0071
252/3
2022/0362601 A1 11/2022 Monfils et al.
2022/0362602 A1 11/2022 Monfils et al.
2022/0362603 A1 11/2022 Monfils et al.
2022/0362604 A1 11/2022 Monfils et al.
2022/0411644 A1 * 12/2022 Rhoades ................ C09D 5/022
2023/0051502 A1 2/2023 Monfils et al.
2023/0256280 A1 8/2023 Monfils et al.
2023/0256281 A1 8/2023 Monfils et al.
2023/0372757 A1 11/2023 Monfils et al.
2024/0189642 A1 * 6/2024 Monfils ................ A62D 1/0042
2024/0189643 A1 * 6/2024 Monfils ................ A62D 1/0042
2024/0198158 A1 * 6/2024 Monfils ................ A62D 1/0071

FOREIGN PATENT DOCUMENTS

CN 105056458 A 11/2015
CN 108042967 A 5/2018
CN 112675469 A 4/2021
CN 112694638 A 4/2021
DE 20 2021 100 301 U1 4/2021
WO WO-2008/058324 A1 5/2008
WO WO-2011/019876 A2 2/2011
WO WO-2011/050980 A2 5/2011
WO WO-2013061266 A1 * 5/2013
WO WO-2016/075480 A1 5/2016
WO WO-2016/082041 A1 6/2016
WO WO-2018/022763 A1 2/2018
WO WO-2018/134393 A1 7/2018
WO WO-2018/234647 A1 12/2018
WO WO-2019/202045 A1 10/2019
WO WO-2020/033255 A1 2/2020
WO WO-2020/084277 A1 4/2020
WO WO 2020/109654 A1 * 6/2020
WO WO-2020/144579 A1 7/2020
WO WO-2020/149733 A1 7/2020
WO WO-2020/217126 A1 10/2020
WO WO-2020/247780 A1 12/2020
WO WO-2021/099308 A1 5/2021
WO WO-2022/094399 5/2022
WO WO-2022/238783 A1 11/2022
WO WO-2022/238784 A1 11/2022
WO WO-2022/238785 A1 11/2022
WO WO-2022/238786 A1 11/2022
WO WO-2022/238787 A1 11/2022
WO WO-2022/240478 A1 11/2022
WO WO-2022/240479 A1 11/2022
WO WO-2022/240480 A1 11/2022
WO WO-2022/240481 A1 11/2022

* cited by examiner

FIRE-FIGHTING FOAM COMPOSITION WITH MICROFIBROUS CELLULOSE

CROSS-REFERENCE TO RELATED APPLICATIONS

This application is a continuation of U.S. patent application Ser. No. 17/722,978, filed on Apr. 18, 2022, which claims the benefit of priority to U.S. Provisional Patent Application Nos. 63/188,633, filed on May 14, 2021; 63/215,006, filed on Jun. 25, 2021; 63/245,028, filed Sep. 16, 2021; 63/288,024, filed on Dec. 10, 2021; 63/288,020, filed on Dec. 10, 2021; 63/288,026, filed on Dec. 10, 2021; and 63/297,384, filed on Jan. 7, 2022, the contents of which are incorporated herein by reference in their entirety.

BACKGROUND

Firefighting foams are often able to fight Class A and Class B fires. Class A fires are those involving combustible material such as paper, wood, etc. and can be fought by quenching and cooling with large quantities of water or solutions containing water. Class B fires are those involving flammable liquid fuels, gasoline, and other hydrocarbons and are difficult to extinguish. Most flammable liquids exhibit high vapor pressure along with low fire and flash points. This typically results in a wide flammability range. In this type of fire, the use of water as the sole firefighting agent is generally ineffective because the only means of fighting fire with water is through cooling.

Conventional foam-forming firefighting compositions may include fluorinated surfactants. There is a strong desire in the marketplace to replace these fluorinated firefighting products with non-fluorinated products. There is therefore a continuing need to produce non-fluorinated firefighting compositions, also known as synthetic fluorine-free foams or SFFF that can be deployed to fight Class A and Class B fires.

Conventional firefighting foam concentrates consist of a complex mixture of different chemicals in a storage stable solution. To maintain usability and commercial viability, such mixtures need to be able to maintain a stable solution with no precipitation, stratification, or large change in viscosity over a storage lifetime across a range of potential storage conditions. This often limits the amounts and combinations of chemicals that can be used producing a fire-fighting foam solution because in the concentrate form those combinations may either be unstable, incompatible, or have fluctuating or too high viscosity.

SUMMARY

The present application is directed to aqueous fire-fighting foam compositions, typically in a concentrated form, which can be diluted with an aqueous diluent to provide a foam precursor composition. The more dilute foam precursor composition may be aerated to form a firefighting foam. The application also provides a method of fighting a fire with the firefighting foam.

The present aqueous firefighting compositions may include a surfactant component, a polysaccharide thickener, and a suspension agent, which includes microfibrous cellulose. The surfactant component may includes one or more of an anionic surfactant, a zwitterionic surfactant and a nonionic surfactant. In some embodiments, one or more components of the concentrate are at least partially insoluble in the concentrate. In such cases, the inclusion of a microfibrous cellulose suspension agent may aid in stabilizing the resulting dispersion.

In any such embodiments, the aqueous fire-fighting composition may include a sugar component; a polysaccharide thickener; a surfactant component, including one or more of an anionic surfactant, a zwitterionic surfactant and a nonionic surfactant; a suspension agent including microfibrous cellulose; and at least about 30 wt. % water; where one or more components is at least partially insoluble and stably dispersed in the concentrate.

In any such embodiments, the aqueous fire-fighting composition may include at least about 1.0 wt. % of a polysaccharide thickener, which is at least partially insoluble in the concentrate; about 5 to 30 wt. % of a surfactant component; a suspension agent including microfibrous cellulose and a co-agent; and at least about 30 wt. % water. The surfactant component may include one or more of an anionic surfactant, a zwitterionic surfactant and a nonionic surfactant. For example, the surfactant component may include an anionic surfactant (e.g., an alkyl sulfate surfactant) in combination with a zwitterionic surfactant (e.g., a betaine and/or sultaine surfactant). In some embodiments, the surfactant component may include an aliphatic alcohol-based nonionic surfactant. The co-agent may include a water-soluble oligosaccharide, such as maltodextrin.

In another aspect, the aqueous fire-fighting composition may include at least about 1.0 wt. % of a polysaccharide thickener, which is at least partially insoluble in the concentrate; about 5 to 30 wt. % of a surfactant component, which comprises one or more of an anionic surfactant and a zwitterionic surfactant; a suspension agent comprising microfibrous cellulose; and at least about 30 wt. % water. Such compositions may be an aqueous fire-fighting concentrate, which is substantially free of cationic surfactants and hydrophobic additives (e.g., vegetable oil and/or vegetable butter, paraffin, and the like).

In another aspect, the aqueous fire-fighting composition may include a sugar component; a polysaccharide thickener; a surfactant component, including one or more of an anionic surfactant, a zwitterionic surfactant and a nonionic surfactant; a suspension agent including microfibrous cellulose; and at least about 30 wt. % water. In some embodiments, one or more components of such a concentrate may be at least partially insoluble in the concentrate.

In another aspect, the aqueous fire-fighting composition may include a monosaccharide sugar; a suspension agent comprising microfibrous cellulose; a polysaccharide thickener, which is at least partially insoluble in the composition but soluble when the composition is diluted by a factor of at least ten with a dilution water; an aliphatic sulfate anionic surfactant; an aliphatic amidoalkyl hydroxysultaine zwitterionic surfactant; one or more of an aliphatic alcohol-based nonionic surfactant and an alkylene glycol ether solvent; and at least about 30 wt. % water. Such compositions may be substantially free of fluorinated additives.

In some embodiments, an aqueous firefighting foam preservative composition may include a suspension system comprising water and a suspension agent; a dispersion of a first polysaccharide which is at least partially insoluble in the suspension system but soluble when the suspension system is diluted by a factor of at least ten with a dilution water. In some embodiments, such a composition may include at least about 0.5 wt. % and, often, at least about 1 wt. % of the first polysaccharide, which is at least partially insoluble in the suspension system. The suspension agent may include a microfibrous cellulose and a co-agent, such as a water-soluble oligosaccharide and/or water-soluble polysaccharide. Such aqueous firefighting foam compositions may also include a second polysaccharide which soluble in the suspension system. Such firefighting foam preservative compositions may also include a foaming agent, e.g., surfactants of the type commonly used in current firefighting foams, such as alkyl sulfate and/or alkyl ether sulfate anionic surfactants and/or aliphatic betaine and/or sultaine zwitterionic surfactants.

In another aspect, a method of producing a firefighting foam includes: diluting a base foam concentrate with a stream of dilution water to provide a first foam solution stream; foaming the first foam solution stream to provide a first finished firefighting foam; modifying the first foam solution stream to include a selected amount of the firefighting foam preservative composition described in the previous paragraph to form a modified foam solution stream; and foaming the modified foam solution stream to form a second finished firefighting foam.

In another aspect, a firefighting foam may be produced by mixing any of the firefighting foam compositions described herein with an aqueous diluent. The diluted composition may then be aerated to produce the first finished firefighting foam.

In another aspect, a method of forming a firefighting foam includes mixing any of the firefighting foam compositions as described herein with an aqueous diluent to form a foam precursor solution, and aerating the foam precursor solution to form a firefighting foam.

In another aspect, a method of fighting a fire includes administering a firefighting foam formed from the compositions as described herein to the fire.

DETAILED DESCRIPTION

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "and" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or illustrative language (e.g., "such as") provided herein, is intended merely to better illuminate the embodiments and does not pose a limitation on the scope of the claims unless otherwise stated. No language in the specification should be construed as indicating any non-claimed element as essential.

In one aspect, an aqueous firefighting foam composition includes a polysaccharide thickener; a surfactant component comprising an anionic surfactant and/or nonionic surfactant and/or zwitterionic surfactant; and a suspension agent comprising a microfibrous cellulose. The composition may be a concentrate where one or more components is at least partially insoluble in the concentrate. The compositions may include a sugar component, which may include monosaccharide sugar(s) and/or sugar alcohol(s). Such compositions may also include a water-miscible organic solvent. Such compositions generally are substantially free of fluorinated additives, e.g., contain no more than 0.1 wt. % fluorinated surfactant and, often, are completely free of any fluorinated surfactant or other fluorinated additive.

As noted, the aqueous firefighting foam compositions of the present disclosure are may be substantially free of any fluorinated compounds. As used herein, the "phrase substantially free of fluorinated compounds" means that the aqueous firefighting foam composition includes no more than 0.01 wt. % of fluorinated compounds. In some embodiments, the aqueous firefighting foam composition includes no more than 0.005 wt. % of fluorinated compounds. In some embodiments, the aqueous firefighting foam compositions of the present disclosure may be substantially free of fluorine. As used herein, the phrase "substantially free of fluorine" means that the composition has a total concentration of fluorine atoms on a weight percentage basis of no more than about 70 part per trillion (ppt) F. The aqueous firefighting foam compositions of the present disclosure preferably include substantially less than 70 ppt F.

The microfibrous cellulose included in the present compositions may include microfibrous cellulose prepared by microbial fermentation or by mechanically disrupting/altering cereal, wood, or cotton-based cellulose fibers. When microfibrous cellulose prepared by microbial fermentation ("fermentation derived cellulose" or "FDC"), e.g., microfibrous cellulose prepared by bacterial fermentation ("bacterially-derived microfibrous cellulose") is utilized, the elimination of cellular debris may allow the production of transparent solutions at typical use levels. Microfibrous cellulose appears to have unique properties based on its ability to function in viscous aqueous systems because it is dispersed rather than solubilized, thereby providing suspension properties in formulations that might otherwise display the hazing and/or precipitation often seen using alternative solubilized polymer suspension agents.

A number of commercially available blends of microfibrous cellulose (MFC) with co-agents, which are suitable for use in the present concentrates, have been reported. For example, there have been reports of such materials that may contain either a mixture of microfibrous cellulose, xanthan gum, and carboxymethyl cellulose (CMC) in a ratio of 6:3:1, or a mixture of microfibrous cellulose, guar gum, and CMC in a ratio of 3:1:1. These blends are reported to allow microfibrous cellulose to be prepared as a dry product, which can be "activated" with high shear mixing into water or other water-based solutions. "Activation" occurs when these microfibrous cellulose blends are added to water and the polysaccharide co-agents become hydrated. After the hydration of the co-agents, high shear is generally needed to effectively disperse the microfibrous cellulose fibers to produce a three-dimensional functional network.

Another commercially available microfibrous cellulose, which is suitable for use in the present concentrates, is sold under the tradename CELLULON™ Fermentation-Derived Cellulose (FDC). CELLULON™ FDC is marketed as an eco-friendly alternative derived from a microbial fermentation process. This may be sold in a liquid form (CELLULON™ Cellulose Liquid, available from CP Kelco). This pre-activated FDC solution offers functionality in high surfactant systems where other hydrocolloids may degrade over time. Alternatively, CELLULON™ FDC is available in a dry powder form, which requires activation via hydration with water and high shear mixing of the aqueous blend. One of products sold under the CELLULON™ cellulose tradename is a mixture containing fermentation-derived cellulose together with maltodextrin and sodium carboxymethyl cellulose (NaCMC) co-agents. In some instances, such a blend may include about 5 to 50 wt. %, or about 10 to 30 wt. %, of fermentation-derived cellulose together with a suitable co-agent(s).

As used herein, the term "fermentation-derived cellulose" (FDC) refers to any microfibrous cellulose produced by a microbial fermentation process (as opposed to materials produced by mechanically disrupting/altering cellulose fibers). CELLULON™ Fermentation-Derived Cellulose products are examples of suitable FDC material that may be used in the present firefighting foam concentrates.

As a consequence of being produced in a microbial fermentation process, the cellulose fibers of an activated FDC material may have a very fine diameter and, once activated, exist as a three-dimensional, highly reticulated net-like structure that gives a very high surface area-to-weight ratio. This three-dimensional, net-like structure can allow the FDC to create a true yield value at low concentrations in a formulation, even those with little or no water, and so provide a mechanism for reliable structuring of liquids and stabilization of components with minimal or no impact on a finished product's viscosity and dispersability.

The microfibrous cellulose included in the present compositions may include microfibrous cellulose produced by mechanically disrupting/altering cellulose fibers, e.g., cereal, wood, and/or cotton-based cellulose fibers—commonly referred to as microfibrillated cellulose (MFC). Microfibrillated cellulose can be obtained through a fibrillation process of cellulose fibers. In such a process, the mechanical shearing can strip away the outer layer of the cellulose fibers, exposing the fibril bundles. The macroscopic fibers are typically mechanically sheared until the fibrils are released, resulting in separation of the cellulose fibers into a three dimensional network of microfibrils with a very large surface area. The exposed fibrils are much smaller in diameter compared to the original fibers, and can form a network or a web-like structure.

One suitable example of microfibrillated cellulose is Exilva™ microfibrillated cellulose (available from Borregaard, Sarpsborg, Norway). Exilva™ microfibrillated cellulose is a pre-activated product, available as a 2% suspension or a 10% paste, that is produced from mechanically disrupting cellulose sourced from Norway spruce. Exilva™ microfibrillated cellulose is reported to be an insoluble microfibrillated cellulose consisting of an entanglement of the cellulose fibers, which has the ability to interact both physically through its extreme surface area and chemically through hydrogen bonding. Other commercial sources of microfibrous cellulose include Celova® microfibrillated cellulose (available from Weidmann Electrical Technology AG (Rapperswil, Switzerland) and Curran® microfibrillated cellulose (available from CelluComp, Fife, Scotland). Curran® microfibrillated cellulose is produced from extraction of nanocellulose fibers from waste streams of root vegetables, primarily carrots and sugar beet pulp.

Another suitable example of a source of microfibrillated cellulose for use in the present compositions is microfibrillated cellulose-mineral composite commercially available from FiberLean® Technologies (Par Moor Centre, United Kingdom). The FiberLean® MFC-composite is reportedly produced by fibrillating the cellulose fibers in the presence of one of a number of different minerals, such as calcium carbonate, clay (e.g., kaolin or bentonite), alumina, zirconia, graphite, silicate or talc, to obtain a nano-fibrillar cellulose suspension.

In many embodiments, the present concentrates may include about 0.1 to 5 wt. %, about 0.5 to 5 wt. % about 1 to 4 wt. % or, in some instances, about 0.5 to 3 wt. % of a suspension agent, which includes microfibrous cellulose. The microfibrous cellulose may include a fermentation-derived cellulose, such as a microfibrous cellulose derived from a microbial fermentation process. The microfibrous cellulose may include cellulose derived from a bacterial fermentation process, e.g., from fermentation of a *Komagataeibacter xylinus* strain or a *Acetobacter xylinum* strain. Fermentation-derived cellulose (FDC) produced by such a method may have an average fiber diameter of about 0.1-0.2 μm. This very small fiber size and diameter means that a given weight of FDC can have up to 200 times more surface area than other common forms of cellulose.

In many embodiments of the present concentrates, the suspension agent includes microfibrous cellulose together with one or more co-agents. The co-agent(s) may suitable include a water-soluble oligosaccharide and/or water-soluble polysaccharide. The suspension agent may suitable include about 5 to 75 wt. % and, in some instances, about 5 to 50 wt. % or about 10 to 30 wt. % of the microfibrous cellulose. The suspension agent may include about 25 to 95 wt. % and, in some instances, about 50 to 90 wt. % or about 70 to 90 wt. % of a co-agent. Quite often, the co-agent may include a water-soluble oligosaccharide, such as maltodextrin. In other instances, the suspension agent may include a water-soluble polysaccharide co-agent, such as one or more of carboxymethyl cellulose (CMC), a carboxymethyl cellulose salt, xanthan gum and guar gum. In one suitable embodiment, the suspension agent includes fermentation-derived cellulose together with a co-agent including sodium carboxymethyl cellulose and maltodextrin.

The microfibrous cellulose employed in the present concentrates may have an average fiber diameter of no more than about 10 μm, no more than about 1 μm, and in some instances about 50 to 300 nm (0.05-0.3 μm). Quite often, the microfibrous cellulose is a derived from microbial fermentation. Prior to inclusion in the present concentrates, such microbial fermentation derived cellulose may be activated by combining a powdered microfibrous cellulose and any optional co-agent with water and then mixing with high shear.

In some embodiments, the present concentrates may include about 0.1 to 5 wt. %, about 0.2 to 5 wt. % about 0.5 to 4 wt. %, or, in some instances, about 0.5 to 3 wt. % microfibrous cellulose. As described herein, the microfibrous cellulose may include fermentation derived cellulose (FDC), microfibrillated cellulose, or a combination thereof. In many instances, the microfibrous cellulose may be formulated together with a co-agent, such as a water-soluble oligosaccharide and/or water-soluble polysaccharide.

The present aqueous fire-fighting foam compositions may include an anionic surfactant. The anionic surfactant may include an aliphatic sulfate surfactant, an aliphatic sulfonate surfactant, aliphatic ether sulfate surfactant and/or an aliphatic ether sulfonate surfactant. The anionic surfactant may include an alkyl sulfate surfactant, an alkyl sulfonate surfactant, alkyl ether sulfate surfactant and/or an alkyl ether sulfonate surfactant. The anionic surfactant may include an alkyl sulfate surfactant and/or an alkyl sulfonate surfactant. The alkyl sulfate salt surfactant may include a $C_{8-12}$-alkyl sulfate salt. Suitable examples of the $C_{8-12}$-alkyl sulfate salt include a dodecyl sulfate salt (lauryl sulfate salt), a decyl sulfate salt, an octyl sulfate salt, or a combination of any two or more thereof. In some embodiments, the alkyl sulfate salt includes an alkyl sulfate sodium salt, such as a sodium decyl sulfate, sodium octyl sulfate, or a combination thereof. In some embodiments, the alkyl sulfate salt includes an alkyl sulfate ammonium salt, such as an ammonium decyl sulfate, ammonium octyl sulfate, ammonium lauryl sulfate, triethanolamine lauryl sulfate salt or a combination thereof. In embodiments that include the anionic surfactant, the aqueous firefighting foam composition may include about 1 to 25 wt. % or about 2 to 20 wt. % of the anionic surfactant. Typically, the aqueous firefighting foam composition may include about 1 to 20 wt. %, about 2 to 15 wt. %, about 5 to 12 wt. % and, in some instances, about 5 to 10 wt. % of a the anionic surfactant.

In some embodiments, the aqueous fire-fighting foam composition may include an anionic surfactant comprises a $C_{8-14}$-alkyl sulfate salt and/or a $C_{8-14}$-alkyl sulfonate salt. In some embodiments, the aqueous fire-fighting foam composition may include an anionic surfactant, which comprises one or more surfactants selected from $C_{8-12}$-alkyl sulfate salts and/or a $C_{8-12}$-alkyl sulfonate salts. For example, one or more of octyl sulfate salts, decyl sulfate salts, dodecyl sulfate salts and tetradecyl sulfate salts may be suitable for use as anionic surfactants in the present foam composition. The anionic surfactant may be a sodium, potassium, and/or ammonium salt (e.g., an $NH_4$+ or trialkyl ammonium salt).

In some embodiments, the aqueous fire-fighting foam composition may include an anionic surfactant comprising a $C_{8-14}$-alkyl sulfate amine salt. In some embodiments, the aqueous fire-fighting foam composition may include an anionic surfactant, which comprises one or more surfactants selected from $C_{8-12}$-alkyl sulfate amine salts and/or a $C_{8-12}$-alkyl sulfonate amine salts. For example, one or more of triethanolamine octyl sulfate salts, triethanolamine decyl sulfate salts, triethanolamine dodecyl sulfate salts and triethanolamine tetradecyl sulfate salts may be suitable for use as anionic surfactants in the present fire-fighting foam composition.

The present aqueous fire-fighting foam compositions may include a zwitterionic surfactant. The zwitterionic surfactant may include one or more of an aliphatic amidoalkyl betaine surfactant, an aliphatic betaine surfactant, an aliphatic sulfobetaine surfactant and an aliphatic amidoalkylene hydroxysultaine surfactant, such as an aliphatic amidopropyl hydroxysultaine surfactant. The zwitterionic surfactant may include one or more of an alkylamidoalkyl betaine surfactant, an alkyl betaine surfactant, an alkyl sulfobetaine surfactant and an alkylamidoalkylene hydroxysultaine surfactant, such as an alkylamidopropyl hydroxysultaine surfactant. For example, the foam composition may include a zwitterionic surfactant, which comprises one or more of a $C_{8-18}$-alkylamidopropyl hydroxysultaine surfactant, a $C_{8-18}$-alkylamidopropyl betaine surfactant a $C_{8-18}$-alkyl sulfobetaine surfactant and a $C_{8-18}$-alkyl betaine surfactant. Suitable examples of the alkylamidoalkylene hydroxysultaine surfactant include a $C_{8-18}$-alkylamidopropyl hydroxysultaine surfactant, such as a cocamidopropyl hydroxysultaine surfactant, which includes a laurylamidopropyl hydroxysultaine and a myristylamidopropyl hydroxysultaine. Suitable examples of the alkylamidoalkyl betaine surfactant include a $C_{8-18}$-alkylamidoalkyl betaine surfactant, such as a cocamidopropyl betaine, a tallowamidopropyl betaine, a laurylamidopropyl betaine or a myristylamidopropyl betaine. In some embodiments, the zwitterionic surfactant includes a $C_{8-14}$-alkylamidopropyl hydroxysultaine, such as a cocamidopropyl hydroxysultaine. In some embodiments, the zwitterionic surfactant includes laurylamidopropyl hydroxysultaine and/or myristylamidopropyl hydroxysultaine. In embodiments that include the zwitterionic surfactant, the aqueous firefighting foam composition may includes about 1 to 15 wt. % and often about 1 to 12 wt. % of the zwitterionic surfactant. In certain embodiments, the aqueous firefighting foam composition may include about 1 to 10 wt. %, or about 2 to 7 wt. %, of the zwitterionic surfactant.

The present aqueous fire-fighting foam concentrates may optionally include a nonionic surfactant. For example, the nonionic surfactant may include an alkylpolyglycoside surfactant and/or an aliphatic amine oxide surfactant. Suitable examples of the alkylpolyglycoside include a $C_{8-16}$-alkylpolyglycoside having an average degree of polymerization of about 1.0-2.0, or about 1.0-1.5. The alkylpolyglycoside surfactant may include a $C_{8-12}$-alkylpolyglycoside, such as a $C_{8-12}$-alkylpolyglucoside. Suitable examples of the alkylpolyglycoside include a $C_{9-11}$-alkylpolyglucoside, such as a $C_{9-11}$-alkylpolyglucoside having an average degree of polymerization of about 1.4-1.7. The $C_{9-11}$-alkylpolyglucoside may include a nonyl, decyl and/or an undecyl polyglucoside. Other suitable examples of the alkylpolyglycoside include a $C_{8-10}$-alkylpolyglucoside, which may have an average degree of polymerization of about 1.0-1.5. In embodiments that include the nonionic surfactant, the aqueous firefighting foam composition may include about 0.1 to 20 wt. % of the nonionic surfactant. Typically, the aqueous firefighting foam composition may include about 0.2 to 15 wt. % and, in some instances about 0.3 to 10 wt. % of a nonionic surfactant, such as a $C_{8-12}$-alkylpolyglycoside. In some embodiments, the composition may contain about 0.3 to 5 wt. % of the nonionic surfactant.

In one aspect, the present aqueous firefighting foam concentrates include an aliphatic alcohol-based component as a nonionic surfactant, such as an aliphatic alcohol and/or an aliphatic alcohol ethoxylate. For example, the concentrate may include an aliphatic alcohol-based component including an aliphatic alcohol having 8 to 14 carbon atoms or an aliphatic alcohol ethoxylate having 10 to 16 carbon atoms in its alcohol portion. Alternatively, the concentrate may include a mixture of an aliphatic alcohol having 8 to 14 carbon atoms and an aliphatic alcohol ethoxylate having 10 to 16 carbon atoms in its alcohol portion. In such mixtures, the ratio of aliphatic alcohol to aliphatic alcohol ethoxylate may be in range of about 10:1 to 1:10, about 5:1 to 1:5, about 2:1 to 1:2, about 1.5:1 to 1:1:5, or about 1:1. The foam concentrate may include about 0.1 to 5 wt. %, about 0.2 to 3 wt. %, or about 0.3 to 2 wt. % of the aliphatic alcohol-based nonionic surfactant. The aliphatic alcohol ethoxylate commonly has an average degree of polymerization (i.e., the average number of ethylene oxide units) of about 0.5-6.0. This may include in various embodiments, no more than about 4.0, no more than about 3.0, or no more than about 2.0. Aliphatic alcohols, which include a linear $C_{8-14}$-aliphatic alcohol, such as a $C_{8-14}$-fatty alcohol, are suitable for use as a nonionic surfactant in the present concentrates. Suitable examples of such alcohols include one or more of octyl alcohol, decyl alcohol, lauryl alcohol and myristyl alcohol. The foam concentrate may include an aliphatic alcohol ethoxylate having an average of no more than about 3 ethylene oxide units. The aliphatic alcohol portion of such ethoxylates typically has about 10 to 16 carbon atoms. Suitable examples include decyl alcohol ethoxylates, lauryl alcohol ethoxylates, myristyl alcohol ethoxylates, and/or cetyl alcohol ethoxylates. Such ethoxylates may have an average of no more than about 3 ethylene oxide units, no more than about 2.0 ethylene oxide units, no more than about 1.5 ethylene oxide units and, in some instances, no more than about 1 ethylene oxide units. In one suitable embodiment, the aliphatic alcohol ethoxylate comprises an ethoxylate of a linear $C_{8-14}$-aliphatic alcohol having no more than about 1.2 ethylene oxide units.

The aliphatic alcohol-based component may include an aliphatic alcohol ethoxylate. The aliphatic alcohol ethoxylate may have an average degree of polymerization (i.e., the average number of ethylene oxide units) of about 0.5-6.0 and often of no more than about 4.0, desirably no more than about 3.0 or no more than about 2.0. Aliphatic alcohols, which include a linear $C_{8-14}$-aliphatic alcohol, such as a $C_{8-14}$-fatty alcohol, are suitable for use as a nonionic surfactant in the present concentrates. Illustrative alcohols include, but are not limited to, one or more of octyl alcohol, decyl alcohol, lauryl alcohol and myristyl alcohol. The foam concentrate may include an aliphatic alcohol ethoxylate having an average of no more than about 3 ethylene oxide units. The aliphatic alcohol portion of such ethoxylates typically has about 10 to 16 carbon atoms. Suitable examples include decyl alcohol ethoxylates, lauryl alcohol ethoxylates, myristyl alcohol ethoxylates, and/or cetyl alcohol ethoxylates. Such ethoxylates may have an average of no more than about 3 ethylene oxide units, no more than about 2.0 ethylene oxide units, no more than about 1.5 ethylene oxide units and, in some instances, no more than about 1 ethylene oxide units. In one suitable embodiment, the aliphatic alcohol ethoxylate comprises an ethoxylate of a linear $C_{8-14}$-aliphatic alcohol having no more than about 1.2 ethylene oxide units.

The aqueous firefighting foam composition may include a thickener, such as a polysaccharide thickener. The polysaccharide thickener may include a polysaccharide that is soluble in the aqueous firefighting foam concentrate and a second polysaccharide that is less soluble or insoluble in the aqueous firefighting foam concentrate. In some embodiments, the second polysaccharide may be insoluble (and dispersed) in the aqueous firefighting concentrate but may be soluble in water alone or in solutions where the concentrate has been diluted with a much larger volume of water. In other embodiments, the concentrate may only include one or more polysaccharides that are completely soluble in the concentrate. The foam concentrate may include about 0.1 to 10 wt. %, about 0.5 to 5 wt. %, about 1 to 4 wt. %, and, often, about 2 to 3 wt. % of the polysaccharide thickener. In some embodiments, the foam concentrate includes about 2 to 3 wt. % of a mixture of polysaccharide thickeners, e.g., a mixture of xanthan gum and one or more of welan gum, succinoglycan and diutan gum.

Illustrative polysaccharide thickeners that may be used in the present foam concentrates include, but are not limited to, agar, sodium alginate, carrageenan, gum arabic, gum guaicum, neem gum, pistacia lentiscus, gum chatti, caranna, galactomannan, gum tragacanth, karaya gum, guar gum, welan gum, rhamsam gum, succinoglycan, locust bean gum, beta-glucan, cellulose, methylcellulose, chicle gum, kino gum, dammar gum, glucomannan, mastic gum, spruce gum, tara gum, gellan gum, acacia gum, cassia gum, diutan gum, fenugreek gum, ghatti gum, hydroxyethylcellulose, hydroxypropylmethylcellulose, karaya gum, konjac gum, pectin, propylene glycol alginate, and a mixture of two or more thereof.

In some embodiments, the polysaccharide thickener may include one or more of xanthan gum, diutan gum, rhamsan gum, welan, gellan gum, guar gum, succinoglycan, konjac gum, tara gum, and methylcellulose. In some embodiments, it may advantageous to include a mixture of xanthan gum and one or more of diutan gum, rhamsan gum, welan gum, gellan Gum, guar gum, succinoglycan, konjac gum, tara gum, and methylcellulose. In other embodiments, the foam concentrate may include a mixture of xanthan gum and one or more of diutan gum, rhamsan gum, welan gum and gellan gum as the polysaccharide thickener. In other embodiments, the foam concentrate may advantageously include one or more of xanthan gum, succinoglycan, welan gum, diutan gum and/or rhamsan gum. In other embodiments, the foam concentrate may advantageously include xanthan gum and succinoglycan. In other embodiments, the foam concentrate may advantageously include xanthan gum and diutan gum. In other embodiments, the foam concentrate may advantageously include xanthan gum and rhamsan gum. In other embodiments, the foam concentrate may advantageously include xanthan gum and welan gum. In other embodiments, the foam concentrate may advantageously include welan gum.

Polysaccharide thickeners, which include a combination of xanthan gum and diutan gum, may be suitable for use in the present foam concentrates. For example, the foam concentrate may include about 0.2 to 3 wt. %, about 0.3 to 2 wt. %, and even, about 0.5 to 1.5 wt. % xanthan gum. Such foam concentrates may also include about 0.1 to 2 wt. %, about 0.5 to 2 wt. % or even, about 0.2 to 1.5 wt. % diutan gum.

In other instances, polysaccharide thickeners, which include a combination of xanthan gum and succinoglycan, may be suitable for use in the present foam concentrates. In other examples, the foam concentrate may include xanthan gum and about 0.5 to 5 wt. %, about 0.5 to 4 wt. % or even, about 1 to 3 wt. % succinoglycan.

In other instances, polysaccharide thickeners, which include a combination of xanthan gum and welan gum, may be suitable for use in the present foam concentrates. In other examples, the foam concentrate may include xanthan gum and about 0.5 to 5 wt. %, about 0.5 to 4 wt. % or even, about 1 to 3 wt. % welan gum.

The present aqueous fire-fighting foam compositions may include a water-miscible solvent that may include one or more of a glycol, a glycol ether, glycerol, and a water-soluble polyethylene glycol. Examples of illustrative organic solvents include, but are not limited to, diethylene glycol n-butyl ether, dipropylene glycol n-propyl ether, hexylene glycol, ethylene glycol, propylene glycol, diethylene glycol, dipropylene glycol, tripropylene glycol, dipropylene glycol monobutyl ether, dipropylene glycol monomethyl ether, diethylene glycol monobutyl ether ("butyl carbitol"), ethylene glycol monobutyl ether, tripropylene glycol monomethyl ether, dipropylene glycol monoethyl ether, glycerol, and mixtures of two or more thereof. The organic solvent may include a mixture of glycerol (glycerine), an alkylene glycol, and a glycol ether, such as a glycol butyl ether. In some embodiments, the organic solvent includes an alkylene glycol ether, such as ethylene glycol monoalkyl ether, propylene glycol monoalkyl ether, dipropylene glycol monoalkyl ether (e.g., diethylene glycol monoalkyl ether (e.g., butyl carbitol). In some embodiments, the organic solvent includes an alkylene glycol, such as ethylene glycol, propylene glycol, dipropylene glycol and/or diethylene glycol. In some embodiments, the organic solvent includes a polyol, such as glycerine. The organic solvent may include a mixture of butyl carbitol, a glycol ether, such as ethylene glycol and/or propylene glycol, and glycerine. For example, the organic solvent can include glycerine, ethylene glycol, and butyl carbitol. In another suitable example, the organic solvent includes glycerine, propylene glycol, and butyl carbitol.

In some instances, the organic solvent in the present compositions may include one or more glycol ethers having at least 8 carbon atoms and/or alkylene glycols having at least 5 carbon atoms (e.g., having about 5 to 12 carbon atoms). Examples of such alkylene glycols include 1,5-pentanediol, 1,6-hexanediol, hexylene glycol, 1,7-heptanediol, 1,8-octanediol, 1,9-nonanediol, 1,10-decanediol and 1,12-dodecanediol. Illustrative glycol ethers include, but are not limited to, ethyleneglycol monophenyl ether, diethyleneglycol monobutyl ether ("butyl carbitol"), ethyleneglycol monohexyl ether, dipropyleneglycol monopropyl ether and dipropylene glycol monobutyl ether. For example, the organic solvent may include one or more of 1,6-hexanediol, hexylene glycol, ethyleneglycol monophenyl ether, butyl carbitol, 1,12-dodecanediol and dipropylene glycol monobutyl ether. For example, the organic solvent may include a combination of 1,6-hexanediol and dipropylene glycol monobutyl ether. In another suitable example, the organic solvent may include a combination of 1,6-hexanediol, ethyleneglycol, butyl carbitol and dipropylene glycol monobutyl ether. In another example, the organic solvent may include a combination of 1,6-hexanediol, dipropylene glycol monobutyl ether and ethyleneglycol monophenyl ether. In another example, the organic solvent may include a combination of 1,6-hexanediol, 1,12-dodecanediol, ethyleneglycol monophenyl ether and dipropylene glycol monobutyl ether. In another example, the organic solvent may include a combination of 1,12-dodecanediol, ethyleneglycol monophenyl ether and dipropylene glycol monobutyl ether. In another example, the organic solvent may include a combination of 1,6-hexanediol, 1,12-dodecanediol and ethyleneglycol monophenyl ether.

The foam composition may include about 1 to 50 wt. % of an organic solvent. They may be from about 1 to 25 wt. %, about 1 to 20 wt. %, about 2 to 15 wt. %, or about 5 to 10 wt. %. The aqueous firefighting foam composition may include an organic solvent that includes an alkylene glycol, glycerine, a glycol ether, or a mixture of any two or more thereof. The alkylene glycol may include 1,6-hexanediol, 1,12-dodecanediol, propylene glycol, or ethylene glycol. The glycol ether may include ethylene glycol monoalkyl ether, diethylene glycol monoalkyl ether, dipropylene glycol monoalkyl ether, triethylene glycol monoalkyl ether, ethyleneglycol monophenyl ether, and 1-butoxyethoxy-2-propanol. In some embodiments, the organic solvent may be a mixture of glycerine, alkylene glycol, and glycol ether. In some embodiments, the organic solvent may be a mixture of glycerine, propylene glycol, and alkyl carbitol. In some embodiments, the organic solvent may be a mixture of glycerine, ethylene glycol, and alkyl carbitol. In such embodiments, the organic solvent may include the alkylene glycol and alkyl carbitol in a weight ratio of about 0.1:1 to 10:1 or about 0.2:1 to 5:1. In some embodiments, the organic solvent may be a mixture of glycerine, ethylene glycol, and butyl carbitol. In some embodiments, the composition may include about 1 to 15 wt. %, or about 1 to 10 wt. % of an alkylene glycol such as ethylene glycol and/or propylene glycol, with about 1 to 15 wt. %, or about 1 to 10 wt. %, of a glycol ether, such as butyl carbitol. In some instances, the composition may also include about 0.1 to 5 wt. %, or about 0.1 to 2 wt. %, of glycerol.

In one aspect, the aqueous firefighting foam compositions of the present disclosure may include a sugar component, which includes a monosaccharide sugar and/or sugar alcohol; polysaccharide thickener; a surfactant component comprising an anionic surfactant, a zwitterionic surfactant, and/or an aliphatic alcohol-based nonionic surfactant; a water-miscible organic solvent; and at least about 30 wt. % water.

Saccharides for use in the present aqueous fire-fighting foam concentrates are generally simple monosaccharide sugars and may include other carbohydrates, such as sugar (sucrose/dextrose) derived from sugar cane or sugar beets. Sucrose is a disaccharide composed from the basic, simple sugar molecules glucose and fructose. Mixtures where the majority of the sucrose has been broken down into its monosaccharide components, glucose and fructose (e.g., invert sugar), are quite suitable for use in the present concentrates. Sucrose is readily available in view of its world production from cane and sugar beet on the order of millions of tons per annum. Illustrative monosaccharides for use in the present foam concentrates include, but are not limited to, glucose, fructose, mannose, xylose, galactose, or mixtures of any two or more thereof. Examples of suitable sugar alcohols for use in the present foam concentrates include one or more of a four carbon sugar alcohol, such as erythritol, a five carbon alditol, such as xylitol, a six carbon alditol, such as mannitol and/or sorbitol, and other sugar alcohols, such as isomalt. The sugar alcohol may be one derived from a monosaccharide.

The present aqueous fire-fighting foam concentrates may include a sugar component comprising at least about 50 wt. % of one or more monosaccharide sugars and/or sugar alcohols. Illustrative sugar components may contain glucose, fructose, mannose, xylose, sorbitol, xylitol, mannitol, or a mixture of any two or more thereof. The foam concentrate may include about 5 to 25 wt. %, or about 10 to 20 wt. %, of the sugar component. In some instances, the foam concentrate may include as much as about 45 wt. % or even 50 wt. % of the sugar component. In some embodiments, the sugar component comprises at least about 75 wt. %, at least about 80 wt. %, or at least about 90 wt. %, of the monosaccharide sugar and/or sugar alcohol. For example, the sugar component may include at least about 50 wt. %, at least about 75 wt. %, at least about 80 wt. %, or at least about 90 wt. % of the glucose, fructose, mannose, xylitol, sorbitol, mannitol, or a mixture of any two or more thereof. In some embodiments, the foam concentrate may include a sugar component that comprises at least about 50 wt. % of a sugar alcohol such as xylitol, sorbitol, mannitol, or a mixture of any two or more thereof. Advantageously, the sugar component may include at least about 50 wt. %, at least about 75 wt. %, at least about 80 wt. %, or at least about 90 wt. % of the glucose, fructose, sorbitol, or a mixture of any two or more thereof. For example, the sugar component may include at least about 50 wt. %, or at least about 75 wt. %, glucose and/or fructose.

In some embodiments, the present aqueous firefighting foam composition may include an alkanolamine, as a pH adjusting agent and/or buffer. Illustrative alkanolamines include, but are not limited to, monoalkanolamines, dialkanolamines and trialkanolamines, such as monoethanolamine, diethanolamine, diisopropanolamine, triethanolamine, or a mixture of any two or more thereof. In some embodiments, the alkanolamine is triethanolamine. The triethanolamine may be present in only a relatively small amount, e.g., about 0.1 to 0.3 wt. % when included primarily as a pH adjusting agent. In other instances, the alkanolamine may be present in a higher amount, whether introduced as an ingredient and/or in the form of a cation as part of one of the surfactants present in the composition (e.g., as a trialkanolamine salt of an alkyl sulfate surfactant). In such instances, an alkanolamine, such as triethanolamine, may be present as about 1 to 15 wt. %, about 2 to 10 wt. %, or about 3 to 8 wt. % of the composition.

As discussed above, the aqueous firefighting foam compositions include water. In some embodiments, the water is from a municipal water source (e.g., tap water). In some embodiments, the water is a purified water, such as purified water that meets the standards set forth in the United States Pharmacopeia, which is incorporated by reference herein in relevant part. In some embodiments, the aqueous firefighting foam composition includes at least about 30 wt. % water, at least about 40 wt. % water, or at least about 50 wt. % water. In some embodiments, the aqueous firefighting foam composition includes greater than about 60 wt. % water. In some embodiments, the aqueous firefighting foam composition may be produced using a source of water that has a total concentration of fluorine atoms on a weight percentage basis of no more than about 70 ppt F.

The aqueous firefighting foam compositions of the present disclosure may be substantially free of any fluorinated additives.

In some embodiments, the aqueous firefighting foam composition includes one or more chelators or sequestering buffers. Illustrative chelators and sequestering buffers include agents that sequester and chelate metal ions, including polyamminopolycarboxylic acids, ethylenediaminetetraacetic acid, citric acid, tartaric acid, nitrilotriacetic acid, hydroxyethylethylenediaminetriacetic acid and salts thereof. Illustrative buffers include Sorensen's phosphate or McIlvaine's citrate buffers.

In some embodiments, the aqueous firefighting foam concentration may include a reducing agent. Accordingly, an aqueous fire-fighting foam concentrate may include a sugar component, an anionic surfactant, a zwitterionic surfactant, an organic solvent comprising glycol ether and/or glycol solvent, a polysaccharide thickener; and a reducing agent. When present, the reducing agent may be present in the foam concentration from about 0.01 wt % to about 5 wt %. This may include from about 0.01 wt % to about 3 wt %, from about 0.05 wt % to about 5 wt %, from about 1 wt % to about 5 wt %, or from about 1 wt % to about 3 wt %.

The reducing agent may be selected such that it is more readily oxidized compared to other components of the foam. For example, the reducing agent may be oxidized more readily than the sugar component or polysaccharide components. Illustrative reducing agents include, but are not limited to, sodium sulfite, sodium bisulfite, sodium metabisulfite, or a mixture of any two or more thereof.

In some embodiments, the aqueous firefighting foam composition includes one or more corrosion inhibitors. Illustrative corrosion inhibitors includes ortho-phenylphenol, tolyltriazole, and phosphate ester acids. In some embodiments, the corrosion inhibitor is tolyltriazole.

In some embodiments, the aqueous firefighting foam concentrate may also include a metallic salt, that may include a multi-valent cation. For example, suitable salts may include a cation selected from the group consisting of aluminum, calcium, copper, iron, magnesium, potassium, and calcium cations. The counteranion may be a sulfate and/or phosphate anion. In one embodiment, the metallic salt may include a divalent salt, e.g., a magnesium salt such as magnesium sulfate. When included, a divalent salt, such as magnesium sulfate, may be present at about 0.1 to 5 wt. %, about 0.3 to 5 wt. %, about 0.5 to 4 wt. %, or about 1 to 3 wt. % of the composition.

In some embodiments, the aqueous firefighting foam concentrate may also include a preservative, such as one or more antimicrobial additives and/or biocidal additives. These components are included to prevent the biological decomposition of natural product based polymers that are incorporated as polymeric film formers (e.g., a polysaccharide gum). Examples include Kathon CG/ICP (Rohm & Haas Company), Givgard G-4 40 (Givaudan, Inc.), Dowicil 75 and Dowacide A (Dow Chemical Company). In some instances, the biocidal agent in the present composition may include a phenol-based biocide, such as Dowacide A (sodium o-phenylphenate).

Tables 1 to 4 below provide illustrations of suitable formulations of the present firefighting foam compositions designed to be combined with a diluent, then aerated and administered to fight a fire in the form of a firefighting foam.

TABLE 1

| Ingredient | Amount (wt. %) |
|---|---|
| Biocide | 0-0.2 |
| Corrosion Inhibitor | 0-0.2 |
| Water | 30-85 |
| Zwitterionic Surfactant | 1-15 |
| Anionic Surfactant | 2-20 |
| Polysaccharide Gum | 0.1-5 |
| Water-miscible organic solvent | 1-20 |
| Monosaccharide sugar(s) and/or sugar alcohol(s) | 5-30 |
| Alkanolamine | 0-5 |

TABLE 2

| Ingredient | Amount (wt. %) |
|---|---|
| Biocide | 0-0.2 |
| Corrosion Inhibitor | 0-0.2 |
| Water | 40-75 |
| Hydroxysultaine Zwitterionic Surfactant | 1-10 |
| Alkyl Sulfate Anionic Surfactant | 5-15 |
| Polysaccharide Gum | 0.2-3 |
| Glycol Ether Solvent | 2-15 |
| Polyol Solvent | 2-10 |
| Monosaccharide sugar(s) and/or sugar alcohol(s) | 5-25 |
| Alkanolamine | 0.1-5 |

TABLE 3

| Ingredient | Amount (wt. %) |
|---|---|
| Biocide | 0-0.2 |
| Corrosion inhibitor | 0-0.2 |
| Water | 50-75 |
| $C_{8-14}$-alkyl amidopropyl hydroxysultaine | 1-10 |
| $C_{8-14}$-Alkyl sulfate surfactant | 5-10 |
| xanthan & diutan gum | 0.5-3 |
| Alkylene glycol | 1-5 |
| Glycol ether | 2-10 |
| Glycerine | 0-2 |
| Alkanolamine | 0.5-5 |
| Monosaccharide sugar(s) | 10-20 |

TABLE 4

| Ingredient | Amount (wt. %) |
|---|---|
| Biocide | 0-0.2 |
| Corrosion Inhibitor | 0-0.2 |
| Water | 55-70 |

TABLE 4-continued

| Ingredient | Amount (wt. %) |
|---|---|
| Cocamidopropyl hydroxysultaine | 2-7 |
| Octyl/Decyl/Lauryl Sulfate | 5-10 |
| Diutan Gum | 0.1-2 |
| Xanthan Gum | 0.2-2 |
| Glycerine | 0-2 |
| Ethylene Glycol | 1-5 |
| Butyl Carbitol | 2-7 |
| Triethanolamine | 0.5-3 |
| Glucose and/or fructose | 5-20 |

EXAMPLES

The following examples more specifically illustrate formulations for preparing aqueous firefighting compositions according to various embodiments described above. These examples should in no way be construed as limiting the scope of the present technology.

Tables 5 and 6 below show the composition of a number of exemplary formulations of the present aqueous firefighting foam composition. The amounts shown in these tables represent the weight percentage of the particular component based on the total weight of the composition. The aqueous formulations include a) an anionic surfactant; b) a zwitterionic surfactant; c) a glycol and/or glycol ether solvent; d) polysaccharide thickener; e) a suspension aid including fermentation derived cellulose; and f) magnesium salt. These exemplary formulations may also include a pH adjusting agent, a preservative, an antimicrobial and/or a corrosion inhibitor, though these ingredients are considered optional in the formulations shown in these tables.

TABLE 5

| Component | Ex. 1 | Ex. 2 | Ex. 3 | Ex. 4 | Ex. 5 | Ex. 6 |
|---|---|---|---|---|---|---|
| Cocamidopropyl Hydroxysultaine | 4.0 | 4.0 | 3.5 | 4.2 | 4.0 | 4.0 |
| Na Octyl Sulfate | 3 | 3.2 | 3.5 | 3.2 | 3.3 | 3.2 |
| TEA Lauryl Sulfate | 3 | 3.2 | 3 | 3.5 | 3 | 3.1 |
| Decyl Sulfate | — | 1.6 | — | 1.2 | 1.4 | 1.5 |
| TEA | 0.2 | ~1.1 | 0.1 | 1.0 | 0.1 | 0.1 |
| Octanol/Lauryl alcohol | — | — | — | 0.7 | 0.5 | — |
| Butyl Carbitol | 5 | 5 | 4.5 | 6 | 5 | 3 |
| 1,6-Hexanediol | — | — | — | — | — | 3 |
| Ethylene glycol | — | 2 | — | — | 2 | 2 |
| Propylene glycol | 2 | — | 2 | 2 | — | — |
| Glycerine*** | (~0.4) | (~0.4) | (~0.35) | (~0.42) | (~0.4) | (~0.4) |
| Glucose/fructose | 14 | ~13.5 | 16 | 17 | 16 | 15 |
| Xanthan/Diutan gum | 2 | 1.5 | — | | | — |
| Xanthan/Welan gum | — | — | 3 | — | — | 2 |
| Xanthan gum/succinoglycan | — | — | — | — | 2 | — |
| FDC** | 1 | 1.25 | 0.8 | 0.9 | 1 | 1 |
| Mg Sulfate | 1.2 | 1.0 | 1.0 | 1.1 | 1.2 | 1 |
| Preservative | 0.1 | 0.1 | 0.1 | 0.1 | 0.1 | 0.1 |
| Tolyltriazole | 0.05 | 0.05 | 0.05 | 0.05 | 0.05 | 0.05 |
| Water | Balance | Balance | Balance | Balance | Balance | Balance |

**fermentation derived cellulose co-formulated with maltodextrin and sodium carboxymethyl cellulose.

***introduced as part of the commercial formulation of the cocamidopropyl hydroxysultaine component.

TABLE 6

| Component | Ex. 7 | Ex. 8 | Ex. 9 | Ex. 10 |
|---|---|---|---|---|
| Cocamidopropyl Hydroxysultaine | 5 | 4 | 4 | 4 |
| Na Octyl Sulfate | 3.5 | 3.3 | 3.3 | 3 |
| TEA Lauryl Sulfate | 3.5 | 3.2 | 3.2 | 3 |
| Decyl Sulfate | — | 1.4 | 1.4 | 1.5 |
| TEA | 0.1 | 0.1 | 0.1 | 0.1 |
| Butyl Carbitol | 6 | 5 | 5 | 5 |
| Ethylene glycol | — | 2 | — | — |
| Propylene glycol | 2 | — | 2 | 2 |
| Glucose/fructose | 16 | 14 | 18 | 18 |
| Xanthan/Diutan gum | 2 | 1.5 | — | — |
| Xanthan/Welan gum | — | — | 2.5 | — |
| Xanthan gum/succinoglycan | — | — | — | 2.5 |
| FDC** | 1.2 | 1 | 1 | 1 |
| Mg Sulfate | 1.25 | 1 | 1 | 1 |
| Preservative | 0.2 | 0.1 | 0.2 | 0.1 |
| Tolyltriazole | 0.05 | 0.05 | 0.05 | 0.05 |
| Water | ~59 | ~63 | ~58 | ~59 |

**fermentation derived cellulose co-formulated with maltodextrin and sodium carboxymethyl cellulose.

The present exemplary aqueous firefighting foam compositions, including the aqueous firefighting foam formulations shown in Tables 1-6, typically have a pH of about 7 to 9. Advantageously, the formulations shown in Tables 1-6 may have a pH of about 7.5 to 8.5. If necessary, a pH-adjusting agent may be added to the composition to achieve the desired pH range.

The present exemplary aqueous firefighting foam compositions, including the exemplary aqueous firefighting foam formulations shown in Tables 1-6, may have a viscosity of about 1,000 to 10,000 cps, in some instances about 1,000 to 5,000 cps and, in some embodiments, may desirably have a viscosity of about 1,000 to 2,500 cps (as determined at room temperature (75° F./24° C.) with a #4 spindle at 30 rpm).

Method of Producing a Firefighting Foam

The firefighting foam concentrates described herein may be mixed with a diluent to form firefighting foam precursor solution, i.e., a use strength composition. The firefighting foam precursor solution may be aerated (e.g., using a nozzle) to produce a firefighting foam including the firefighting foam concentrate and the diluent. Exemplary diluents may include water, such as fresh water, brackish water, sea water, and combinations thereof. In some embodiments, the firefighting foam compositions described above may be 1 vol. %, 3 vol. %, or 5 vol. % concentrate solutions, meaning that the firefighting foam compositions are mixed with 99 vol. %, 97 vol. %, or 95 vol. % diluent, respectively, to form the firefighting foam precursor solution.

In some instances, it has been found that the order of addition of ingredients with appropriate agitation may impact the actual firefighting performance as seen in the UL and EN fire tests. It may be suitable to begin by mixing the sugar component with a substantial amount of water and subsequently preparing a solution or slurry of the polysaccharide thickener in the aqueous sugar solution prior to blending in the remaining components of the foam concentrate. It was found that first preparing an aqueous sugar solution by combining and mixing the sugars (e.g., glucose, fructose, and/or sorbitol) with water may facilitate later dissolution and/or dispersal of the biogums/biopolymers (e.g., xanthan gum). This can allow the gums to properly hydrate without encapsulating (clumping) upon the addition of the surfactant(s), other optional additives and remaining amounts of water. Surfactants and other optional additives can then be added and the resulting mixture may finally be diluted further with water to decrease the viscosity of the preparation, if desired.

Firefighting foams that were prepared not following this order of component addition may result in polysaccharide bio gums that are encapsulated, but not fully hydrated, which can result in the production of foams that are not satisfactory for fire testing. Thus, in some embodiments, the initial formation of an aqueous sugar solution is important in process order and can be used to dissolve/disperse polysaccharide thickener(s) into the foam concentrate before addition of any other ingredients, such as surfactant(s) and/or other additives.

Method of Fighting a Fire

The firefighting foam compositions described herein may be used to fight a fire and/or to suppress flammable vapors by mixing the firefighting foam compositions with a diluent, aerating the resulting firefighting foam precursor solution to form a firefighting foam, and administering the firefighting foam to a fire or applying the firefighting foam to the surface of a volatile flammable liquid (e.g., gasoline or other flammable hydrocarbon or a flammable polar solvent).

Illustrative Embodiments

Reference is made to a number of illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the methods, materials, and compositions described herein.

In an exemplary embodiment, the aqueous firefighting foam composition includes a sugar component; a polysaccharide thickener; a surfactant component, including one or more of an anionic surfactant, a zwitterionic surfactant and a nonionic surfactant; a suspension agent including microfibrous cellulose; and at least about 30 wt. % water; where one or more components is at least partially insoluble and stably dispersed in the concentrate. Such compositions may be an aqueous fire-fighting concentrate, which is substantially free of cationic surfactants and hydrophobic additives (e.g., vegetable oil and/or vegetable butter, paraffin, and the like). The compositions may be substantially free of fluorinated additives and may contain a total of no more than about 0.1 wt % fluorinated additives, such as fluorinated surfactant(s) and/or fluorinated polymer(s).

In one exemplary embodiment, the aqueous fire-fighting composition includes at least about 1.0 wt. % of a polysaccharide thickener, which is at least partially insoluble in the concentrate; about 5 to 30 wt. % of a surfactant component; a suspension agent including microfibrous cellulose and a co-agent; and at least about 30 wt. % water. The surfactant component may includes one or more of an anionic surfactant, a zwitterionic surfactant and a nonionic surfactant. For example, surfactant component may includes an anionic surfactant (e.g., an alkyl sulfate surfactant) in combination with a zwitterionic surfactant (e.g., a betaine and/or sultaine surfactant). In some such instances, the surfactant component may include an aliphatic alcohol-based nonionic surfactant. The co-agent may include a water-soluble oligosaccharide, such as maltodextrin. Such compositions may be an aqueous fire-fighting concentrate, which is substantially free of cationic surfactants and hydrophobic additives (e.g., vegetable oil and/or vegetable butter, paraffin, and the like). The compositions may be substantially free of fluorinated additives or may contain a total of no more than about 0.1 wt % fluorinated additives, such as fluorinated surfactant(s) and/or fluorinated polymer(s).

In another exemplary embodiment, the aqueous fire-fighting composition includes at least about 1.0 wt. % of a polysaccharide thickener, which is at least partially insoluble in the concentrate; about 5 to 30 wt. % of a surfactant component, which comprises one or more of an anionic surfactant, a zwitterionic surfactant and a nonionic surfactant; a suspension agent comprising microfibrous cellulose; and at least about 30 wt. % water. Such compositions may be an aqueous fire-fighting concentrate, which is substantially free of cationic surfactants and hydrophobic additives (e.g., vegetable oil and/or vegetable butter, paraffin, and the like). The compositions may be substantially free of fluorinated additives or may contain a total of no more than about 0.1 wt % fluorinated additives, such as fluorinated surfactant(s) and/or fluorinated polymer(s).

In another exemplary embodiment, the aqueous fire-fighting composition includes a sugar component; a polysaccharide thickener; a surfactant component, including one or more of an anionic surfactant, a zwitterionic surfactant and a nonionic surfactant; a suspension agent including microfibrous cellulose; and at least about 30 wt. % water. The components of such a concentrate may be at least partially insoluble in the concentrate. Such compositions may be an aqueous fire-fighting concentrate, which is substantially free of cationic surfactants and hydrophobic additives (e.g., vegetable oil and/or vegetable butter, paraffin, and the like). The compositions may be substantially free of fluorinated additives or may contain a total of no more than about 0.1 wt % fluorinated additives, such as fluorinated surfactant(s) and/or fluorinated polymer(s).

In another exemplary embodiment, the aqueous fire-fighting composition includes a monosaccharide sugar; a suspension agent comprising microfibrous cellulose; a polysaccharide thickener, which is at least partially insoluble in the composition but soluble when the composition is diluted by a factor of at least ten with a dilution water; an aliphatic sulfate anionic surfactant; an aliphatic amidoalkyl hydroxysultaine zwitterionic surfactant; one or more of an aliphatic alcohol-based nonionic surfactant and an alkylene glycol ether solvent; and at least about 30 wt. % water. Such compositions are commonly substantially free of fluorinated additives. Such compositions may be an aqueous fire-fighting concentrate, which is substantially free of cationic surfactants and hydrophobic additives (e.g., vegetable oil and/or vegetable butter, paraffin, and the like). Such compositions may contain a total of no more than about 0.1 wt % fluorinated additives, such as fluorinated surfactant(s) and/or fluorinated polymer(s).

Another exemplary embodiment provides an aqueous firefighting foam preservative composition including a suspension system comprising water and a suspension agent; a dispersion of a first polysaccharide which is at least partially insoluble in the suspension system but soluble when the suspension system is diluted by a factor of at least ten with a dilution water. The compositions may include at least about 0.5 wt. %, or at least about 1 wt. %, of the first polysaccharide, which is at least partially insoluble in the suspension system. In some instances, the composition may include about 0.5 to 10 wt. %, or about 1 to 5 wt. %, of the first polysaccharide, which is at least partially insoluble in the suspension. The suspension agent may include microfibrous cellulose and a co-agent, such as a water-soluble oligosaccharide and/or water-soluble polysaccharide. Such aqueous firefighting foam compositions may also include a second polysaccharide which soluble in the suspension system. Such compositions may be an aqueous fire-fighting concentrate, which is substantially free of cationic surfactants and hydrophobic additives (e.g., vegetable oil and/or vegetable butter, paraffin, and the like). The compositions may be substantially free of fluorinated additives or may contain a total of no more than about 0.1 wt % fluorinated additives, such as fluorinated surfactant(s) and/or fluorinated polymer(s).

Another exemplary embodiment provides an aqueous firefighting foam preservative composition which includes about 10 to 25 wt. % of the monosaccharide sugar; about 1 to 5 wt. % of the polysaccharide thickener; about 5 to 15 wt. % of the aliphatic sulfate anionic surfactant; about 1 to 8 wt. % of the aliphatic amidoalkyl hydroxysultaine zwitterionic surfactant; about 0.2 to 10 wt. % of the aliphatic alcohol-based nonionic surfactant and/or alkylene glycol ether solvent; and about 0.5 to 5 wt. % of the microfibrous cellulose; and at least about 30 wt. % water. Such compositions may be an aqueous fire-fighting concentrate, which is substantially free of cationic surfactants and hydrophobic additives (e.g., vegetable oil and/or vegetable butter, paraffin, and the like). The compositions may be substantially free of fluorinated additives or may contain a total of no more than about 0.1 wt % fluorinated additives, such as fluorinated surfactant(s) and/or fluorinated polymer(s).

In the illustrative embodiments described in this section, such compositions may may include a sugar component, e.g., a sugar component where at least about 50 wt. % {>85 wt. %} of is one or more monosaccharide sugars (such as glucose and/or fructose) and/or sugar alcohol(s). The sugar component often contains a total of no more than about 10 wt. % or even no more than about 5 wt. % disaccharide sugars and oligosaccharides. Examples of suitable monosaccharide sugars and sugar alcohols include glucose, fructose, mannose, xylose, xylitol, sorbitol, mannitol and combinations of include two or more thereof.

In the illustrative embodiments described in this section, such compositions may may include surfactant component containing a zwitterionic surfactant and an anionic surfactant. For example, the compositions may include a betaine and/or sultaine zwitterionic surfactant; and an alkyl sulfate and/or alkyl ether sulfate anionic surfactant. Other examples of suitable anionic surfactants include one or more of an aliphatic sulfate surfactant, an aliphatic sulfonate surfactant, an aliphatic succinate salt and an aliphatic ether sulfate surfactant. Quite often, the anionic surfactant may include one or more of a $C_8$-$C_{14}$ alkyl sulfate, a $C_8$-$C_{14}$ alkyl sulfonate and a $C_{10}$-$C_{14}$ alkyl ether sulfate. It may suitable for the anionic surfactant to include one or more $C_8$-$C_{14}$ alkyl sulfate salts, such as one or more of an octyl sulfate salt, a decyl sulfate salt and a lauryl sulfate salt. When the composition includes an anionic surfactant, it may be present at about 2 to 20 wt. %, or about 5 to 15 wt. %, of the composition.

In the illustrative embodiments described in this section, the surfactant component may include a zwitterionic surfactant, such as one or more of an aliphatic amidoalkyl betaine, an aliphatic sulfobetaine, an aliphatic amidoalkyl hydroxysultaine and an aliphatic hydroxysultaine. Suitably, the zwitterionic surfactant may include one or more $C_8$-$C_{14}$ alkyl amidopropyl hydroxysultaine, e.g., a mixture which includes lauramidopropyl hydroxysultaine and myristamidopropyl hydroxysultaine, such as cocamidopropyl hydroxysultaine. When the composition includes an zwitterionic surfactant, it may be present at about 1 to 10 wt. %, or about 2 to 7 wt. %, of the composition.

In the illustrative embodiments described in this section, such compositions may may include an organic solvent, e.g., a water-miscible solvent, such as an alkylene glycol ether and/or an alkylene glycol. Suitable water-miscible solvents includes diethylene glycol monobutyl ether, dipropylene glycol monomethyl ether, ethylene glycol monobutyl ether, 1,6-hexanediol, ethylene glycol, hexylene glycol, propylene glycol and glycerine. When the composition includes a water-miscible solvent, it may be present at about 1 to 20 wt. %, or about 1 to 15 wt. %, of the composition. In some instances, the water-miscible solvent, it may be present at about 1 to 10 wt. %, or about 1 to 5 wt. %, of the composition.

In the illustrative embodiments described in this section, in some instances such compositions may include an organic solvent including a glycol ether having at least 8 carbon atoms and/or an alkylene glycol having at least 5 carbon atoms. Suitable examples of such organic solvents include one or more of diethylene glycol monobutyl ether, ethylene glycol monophenyl ether, dipropylene glycol monobutyl ether, dipropylene glycol monomethyl ether, 1,6-hexanediol, 1,12-dodecanediol, ethylene glycol, hexylene glycol, propylene glycol and glycerine.

In the illustrative embodiments described in this section, in some instances such compositions may include a nonionic surfactant, such as one or more of an alkyl polyglucoside, an aliphatic alcohol, an ethoxylated aliphatic alcohol and an aliphatic amine oxide. For example, it may quite suitable to include a nonionic surfactant, which includes an aliphatic alcohol-based component comprising one or more $C_{8-14}$-aliphatic alcohols and/or ethoxylates of $C_{10-14}$-aliphatic alcohols having an average of no more than about 6 ethylene oxide units. Such ethoxylates may have an average of no more than about 3 ethylene oxide units and, in many instances, average of no more than about 1.5 ethylene oxide units. In some cases, the nonionic surfactant includes two or more $C_{8-14}$-aliphatic alcohols, such as a mixture including octyl alcohol and lauryl alcohol.

In the illustrative embodiments described in this section, the composition may includes a polysaccharide thickener, such as one or more of xanthan gum, diutan gum, rhamsan gum, welan gum, gellan gum, guar gum, konjac gum, tara gum, succinoglycan and methylcellulose. The polysaccharide thickener may include one or more of xanthan gum, diutan gum, welan gum, succinoglycan and rhamsan gum. In some instances, the polysaccharide thickener may include a mixture of xanthan gum and one or more of diutan gum, welan gum, succinoglycan and rhamsan gum.

In the illustrative embodiments described in this section, composition may include about 0.1 to 5 wt. % or about 0.5 to 3 wt. % of the suspension agent. The suspension agent may include about 5 to 75 wt. % {in some instances about 5 to 50 wt. % or about 10 to 30 wt. %} of the microfibrous cellulose. In may instances, the microfibrous cellulose includes a fermentation derived cellulose, such as microfibrous cellulose derived from a microbial fermentation process. Often the microfibrous cellulose may be derived from a bacterial fermentation process. In some embodiments, the microfibrous cellulose may have an average fiber diameter of no more than about 10 μm, no more than about 1 μm, or from about 50 to 300 nm. Prior to incorporation into the present compositions, the microfibrous cellulose may advantageously have been activated by combining a powdered form of the microfibrous cellulose and optionally co-agent with water and mixing with high shear.

In the illustrative embodiments described in this section, as has been noted herein the suspension agent often also include a co-agent, such as a water-soluble oligosaccharide and/or water-soluble polysaccharide. In many instances, the suspension agent may include about 25 to 95 wt. % {in some instances about 50 to 90 wt. % or about 70 to 90 wt. %} of the co-agent. It is very common for the co-agent to include a water-soluble oligosaccharide {e.g., maltodextrin}. In suitable examples, the suspension agent may include a co-agent comprising one or more of carboxymethyl cellulose (CMC), a carboxymethyl cellulose salt, xanthan gum and guar gum. In some instances, the suspension agent may include a co-agent comprising a mixture of sodium carboxymethyl cellulose and maltodextrin.

In the illustrative embodiments described in this section, the composition may have a pH of about 7 to 9. Advantageously, the compositions may have a pH of about 7.5 to 8.5. If necessary, a pH-adjusting agent may be added to the composition to achieve the desired pH range. Suitable examples of pH-adjusting agents include acidic agents, such as citric acid, and basic agents, such as alkanolamines, e.g., triethanolamine.

In any of the illustrative embodiments described in this section, the composition may also include one or more additional additives, such as one or more of a chelator, a buffer, a corrosion inhibitor, a divalent metal salt and a preservative. Examples of suitable divalent metal salts include magnesium salts {e.g., magnesium sulfate and/or magnesium acetate}.

In another exemplary embodiment, a firefighting foam may be created by mixing any of the preceding firefighting foam compositions and an aqueous diluent. The diluted composition may then be aerated to produce the firefighting foam. The aqueous diluent may be include one or more of fresh water, brackish water and sea water.

Another exemplary embodiment provides a method of forming a firefighting foam in which the method includes the steps of mixing the firefighting foam composition of any of the preceding illustrative embodiments with an aqueous diluent to form a foam precursor solution, and aerating the foam precursor solution to form the firefighting foam. In such a method the aqueous diluent may include one or more of fresh water, brackish water and sea water.

Another exemplary embodiment is a method of fighting a fire, where the method includes the steps of administering the firefighting foam described in the preceding exemplary embodiments to the fire.

Another exemplary embodiment provides a method of fighting a fire, where the method includes the steps of administering a firefighting foam, which includes any of the firefighting foam compositions described herein, to the fire.

In the exemplary embodiments described above, it may be advantageous to provide an aqueous firefighting foam composition, which does not contain any hydrophobic additives. In some instances, it may be advantageous to provide an aqueous firefighting foam composition, which does not contain any cationic surfactant(s). In some instances, it may be advantageous to provide an aqueous firefighting foam composition, which is substantially free of acemannan {substantially free of aloe vera derived material}.

In the exemplary embodiments described above, it may be advantageous to provide an aqueous firefighting foam composition, which does not contain any proteinaceous material (e.g., protein and/or degraded protein, such as protein hydrolysate). In some instances, it may be advantageous to provide an aqueous firefighting foam composition, which does not contain any synthetic polymer or copolymer. In some instances, it may be advantageous to provide an aqueous firefighting foam composition, which does not contain any non-biopolymeric thickening agent.

In the exemplary embodiments described above, it may be advantageous to provide an aqueous firefighting foam composition, which is substantially free of glycine betaine. In some instances, it may be advantageous to provide an aqueous firefighting foam composition, which is substantially free of sodium lactate. In some instances, it may be advantageous to provide an aqueous firefighting foam composition, which is substantially free of fluorinated additives.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An aqueous fire-fighting composition comprising:

a sugar component;

a polysaccharide thickener;

a surfactant component comprising an anionic surfactant, a zwitterionic surfactant, or a mixture thereof:

a suspension agent comprising a microfibrillated cellulose; and at least about 30 wt. % water;

wherein: the polysaccharide thickener is at least partially insoluble in the aqueous fire-fighting composition and the fire-fighting composition is substantially free of non-ionic surfactants.

2. The aqueous fire-fighting composition of claim 1, wherein the sugar component comprises glucose, fructose, mannose, xylose, xylitol, sorbitol, mannitol, or a mixture of any two or more thereof.

3. The aqueous fire-fighting composition of claim 1, wherein the surfactant component comprises a betaine and/or sultaine zwitterionic surfactant; and an alkyl sulfate and/or alkyl ether sulfate.

* * * * *